US009613266B2

(12) United States Patent
Liang et al.

(10) Patent No.: US 9,613,266 B2
(45) Date of Patent: Apr. 4, 2017

(54) COMPLEX BACKGROUND-ORIENTED OPTICAL CHARACTER RECOGNITION METHOD AND DEVICE

(71) Applicant: GRG Banking Equipment Co., Ltd., Guangzhou, Guangdong (CN)

(72) Inventors: Tiancai Liang, Guangdong (CN); Liangxu Chen, Guangdong (CN); Xingyu Zhao, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 15/032,167

(22) PCT Filed: Jan. 29, 2014

(86) PCT No.: PCT/CN2014/071731
§ 371 (c)(1),
(2) Date: Apr. 26, 2016

(87) PCT Pub. No.: WO2015/066984
PCT Pub. Date: May 14, 2015

(65) Prior Publication Data
US 2016/0259972 A1    Sep. 8, 2016

(30) Foreign Application Priority Data
Nov. 8, 2013  (CN) .......................... 2013 1 0553984

(51) Int. Cl.
*G06K 9/34*      (2006.01)
*G06K 9/00*      (2006.01)
(Continued)

(52) U.S. Cl.
CPC .......... *G06K 9/00442* (2013.01); *G06K 9/344* (2013.01); *G06K 9/346* (2013.01);
(Continued)

(58) Field of Classification Search
CPC .......... G06K 2209/01; G06K 7/10732; G06K 9/00442; G06K 9/325; G06T 11/60
See application file for complete search history.

(56) References Cited

U.S. PATENT DOCUMENTS

| 9,036,894 B2 * | 5/2015 | Panetta .............. G06K 7/10712 |
| | | 382/142 |
| 2003/0179934 A1 | 9/2003 | Albertelli et al. |
| | | (Continued) |

FOREIGN PATENT DOCUMENTS

| CN | 1811794 A | 8/2006 |
| CN | 101303803 A | 11/2008 |
| | (Continued) | |

OTHER PUBLICATIONS

International Search Report for PCT/CN2014/071731, mailed May 12, 2014, ISA/CN.
(Continued)

*Primary Examiner* — Matthew Bella
*Assistant Examiner* — Dennis Rosario
(74) *Attorney, Agent, or Firm* — U.S. Fairsky LLP; Yue Xu (57) ABSTRACT

A complex background-oriented optical character recognition method and device are provided. The method of the present invention includes: collecting image information to obtain a collected image; according to character characteristics, acquiring a target character region from the collected image, and taking same as a target object; extracting character edge information in the target object using a differential method to obtain an extracted image; superposing the target object and the extracted image to obtain a recovery image; conducting inversion and Gaussian filtration processing on the recovery image to obtain a processed image; searching for a target character location in the processed image; and recognizing the target character location. On this basis, accurate and quick locating and recognition of characters can be realized on the basis of effectively suppressing background noise and highlighting character information.

9 Claims, 10 Drawing Sheets (51) Int. Cl.
*G06K 9/46* (2006.01)
*G06T 7/00* (2017.01)
*G06T 11/60* (2006.01)

(52) U.S. Cl.
CPC .......... *G06K 9/4604* (2013.01); *G06T 7/0085* (2013.01); *G06T 11/60* (2013.01); *G06K 2009/4666* (2013.01); *G06K 2209/01* (2013.01); *G06T 2207/20024* (2013.01); *G06T 2207/20144* (2013.01)

(56) References Cited

U.S. PATENT DOCUMENTS

| | | | |
|---|---|---|---|
| 2009/0252434 | A1 | 10/2009 | Zhou |
| 2010/0260435 | A1 | 10/2010 | Orlick |

FOREIGN PATENT DOCUMENTS

| | | | |
|---|---|---|---|
| CN | 1011667289 | A | 3/2010 |
| CN | 101872416 | A | 10/2010 |
| CN | 101903907 | A | 12/2010 |
| CN | 102426649 | A | 4/2012 |
| CN | 102622732 | A | 8/2012 |
| CN | 102779275 | A | 11/2012 |
| CN | 102831416 | A | 12/2012 |
| CN | 102915438 | A | 2/2013 |
| CN | 103258198 | A | 8/2013 |
| WO | 03083776 | A1 | 10/2003 |

OTHER PUBLICATIONS

European Search Report for Application No. 14859485.6-1901/3067830, mailed Dec. 6, 2016.
Jie Zhang: "Name card image enhancement and restoration for text recognition", In: "Master Thesis, National University of Singapore", Jul. 27, 2004, XP055322561.
Seong Jong Ha et al: "Fast text line extraction in document images", Image Processing (ICIP), 2012 19th IEEE International Conference on, IEEE, Sep. 30, 2012.
Istvan Marosi: "Industrial OCR approaches: architecture, algorithms, and adaptation techniques", Optical Sensing II, vol. 6500, Jan. 28, 2007, XP055322670.
Milan Sonka et al: "Edge detectors", In: "Image Processing, Analysis, and Machine Vision", Jan. 1, 2008,Thomson Learning, XP055323119.
Yasser Alginahi: "Preprocessing Techniques in Character Recognition", In:"Character Recognition", Aug. 17, 2010, XP055322575.

* cited by examiner

| 1 | 1 | 1 | -1 | 0 | 1 |
|---|---|---|----|---|---|
| 0 | 0 | 0 | -1 | 0 | 1 |
| -1 | -1 | -1 | -1 | 0 | 1 |

COMPLEX BACKGROUND-ORIENTED OPTICAL CHARACTER RECOGNITION METHOD AND DEVICE

This application is a National Stage application of PCT international application PCT/CN2014/071731, filed on Jan. 29, 2014, which claims priority to Chinese patent application No. 201310553984.1 titled "COMPLEX BACKGROUND-ORIENTED OPTICAL CHARACTER RECOGNITION METHOD AND DEVICE" and filed with the Chinese State Intellectual Property Office on Nov. 8, 2013, both of which are incorporated herein by reference in their entireties.

FIELD

The present disclosure relates to the character locating and recognition field, specifically to a complex background-oriented optical character recognition method and a device thereof.

BACKGROUND

In practical production and life, character locating and recognition has many applications, such as recognition of a vehicle license number, a banknote crown word number and an identity number in an identity card, and detection of printed numbers in various product packaging. As these characters have significance or a commercial value, it is more and more important to automatically recognize them in practical production and life.

Subject to factors such as a shooting device, an illumination condition and a shooting scene, a captured image usually has a complex background an unclear target region, thus effective image segmentation can not be performed.

Figure 1:
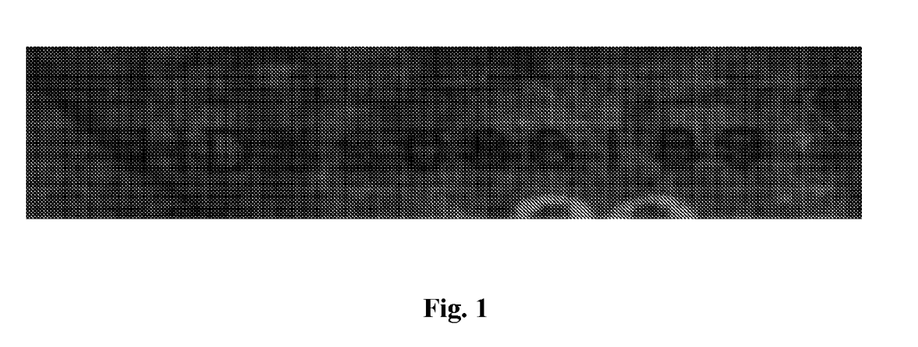
FIG. 1 is a schematic diagram of an image of an optical character region in a klunky banknote in conventional technology.
Figure 11:
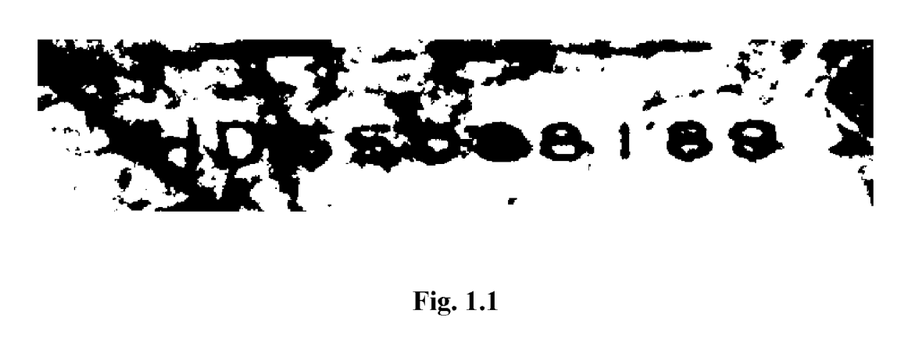

The character locating is a critical precondition of recognition, and a locating precision thereof directly influences an accuracy of the recognition. In most conventional methods, a target locating is performed after an image is converted into a binary image. The disadvantage of this kind of methods is that the locating precision relies on an effect of threshold segmentation. A target locating error caused by a poor binarization effect will occur if the image has a complex scene, a low contrast or an uneven illumination. FIG. 1 is an image of an optical character region in a banknote, and the banknote is klunky due to a long time of circulation, which severely degrades an image quality and results in a very complex character background, thus it is difficult to extract characters from the image. And the characters can not be effectively extracted after the image is converted into a binary image, where the effect after the converting is illustrated in FIG. 1.1.

Figure 12:
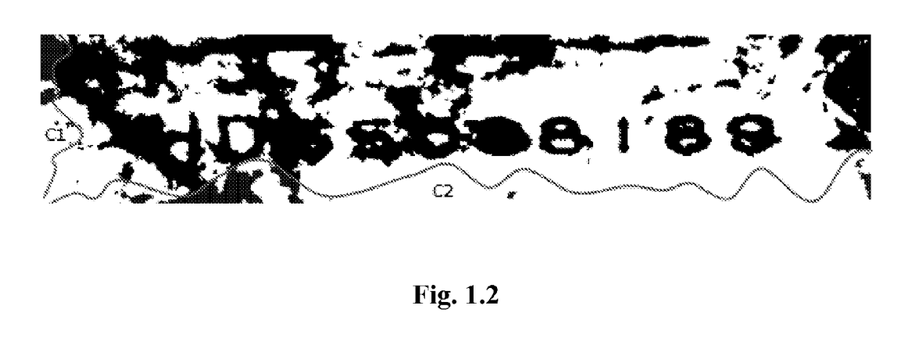

The character locating can be performed after an image is converted into a binary image, and the object of locating is achieved with projection information of the binary image in the horizontal direction and the vertical direction in a conventional method. The limitation of the method is that an algorithm thereof relies on the binarization process. Rupture or adhesion of characters usually occurs after binarization in a case of a complex target background or a poor shooting effect. Under this circumstance, the projection information is inaccurate, which influences an effect of the locating. A result illustrated in FIG. 1.2 is obtained by processing FIG. 1.1 with a method of projection. Curves C1 and C2 in FIG. 1.2 are projection curves of the image in the horizontal direction and the vertical direction, respectively, and as can be seen, the method of projection can not effectively determine a boundary of the characters.

SUMMARY

In a complex background-oriented optical character recognition method and a device thereof provided according to embodiments of the disclosure, an original image and an image obtained by edge detection are superposed to obtain an image, then an inverse and a Gaussian filtering are performed on the image obtained, and on the basis of the above, a calculation is performed on the image processed to obtain an integral image, thus achieving an accurate and rapid locating and recognition of characters with background noise effectively suppressed and character information highlighted.

A complex background-oriented optical character recognition method is provided according to an embodiment of the disclosure, which includes:

capturing image information, to obtain a captured image;

acquiring a region of target characters from the captured image based on character characteristics as a target object;

extracting character edge information in the target object by using a differential method, to obtain an extracted image;

superposing the target object and the extracted image, to obtain a recovery image;

performing an inverse and a Gaussian filtering on the recovery image, to obtain a processed image;

searching for a location of the target characters in the processed image; and recognizing the target characters.

Optionally, the capturing the image information includes capturing the image information with an image sensor.

Optionally, the image sensor includes a full frame contact image sensor.

Optionally, the extracting the character edge information in the target object by using the differential method includes extracting the character edge information in the target object by using a Prewitt operator edge detection method.

Optionally, the searching for the location of the target characters in the processed image includes:

determining a search box based on the character characteristics and the processed image; and sliding the search box in the processed image continuously by a predetermined rule, calculating a sum of grayscales of pixels in the search box, and determining a location of the search box in which the sum of grayscales of pixels is the greatest to be the location of the target characters.

Optionally, the searching for the location of the target characters in the processed image includes:

determining a search box based on the character characteristics and the processed image;

converting the processed image into an integral image; and sliding the search box in the integral image continuously by a predetermined rule, calculating a sum of grayscales of pixels in the search box, and determining a location of the search box in which the sum of grayscales of pixels is the greatest to be the location of the target characters, where a value of a point in the integral image is a sum of grayscales of all pixels in a rectangle region which has a diagonal from the top left corner of the processed image to the point.

A complex background-oriented optical character recognition device is provided according to an embodiment of the disclosure, which includes:

a capture module, configured to capture image information, to obtain a captured image;

an acquisition module, configured to acquire a region of target characters from the captured image based on character characteristics as a target object;

an extracting module, configured to extract character edge information in the target object by using a differential method, to obtain an extracted image;

a superposing module, configured to superpose the target object and the extracted image, to obtain a recovery image;

a processing module, configured to perform an inverse and a Gaussian filtering on the recovery image, to obtain a processed image;

a search module, configured to search for a location of the target characters in the processed image; and a recognition module, configured to recognize the target characters.

Optionally, the search module includes:

a first determination sub-module, configured to determine a search box based on the character characteristics and the processed image; and a first processing sub-module, configured to slide the search box in the processed image continuously by a predetermined rule, calculate a sum of grayscales of pixels in the search box, and determine a location of the search box in which the sum of grayscales of pixels is the greatest to be the location of the target characters.

Optionally, the search module includes:

a second determination sub-unit, configured to determine a search box based on the character characteristics and the processed image;

a conversion sub-unit, configured to convert the processed image into an integral image; and a second processing sub-module, configured to slide the search box in the integral image continuously by a predetermined rule, calculate a sum of grayscales of pixels in the search box, and determine a location of the search box in which the sum of grayscales of pixels is the greatest to be the location of the target characters.

In embodiments of the disclosure, image information is captured first, to obtain a captured image; then a region of target characters is acquired from the captured image based on character characteristics as a target object; then character edge information in the target object is extracted by using a differential method, to obtain an extracted image; then the target object and the extracted image are superposed, to obtain a recovery image; then an inverse and a Gaussian filtering are performed on the recovery image, to obtain a processed image; then a location of the target characters is searched for in the processed image; and finally, the target characters are recognized. In the complex background-oriented optical character recognition method and the device thereof provided according to embodiments of the disclosure, an original image and an image obtained by edge detection are superposed to obtain an image, and then an inverse and a Gaussian filtering are performed on the image obtained. On the basis of the above, a calculation is performed on the image processed to obtain an integral image, and the locating process is accelerated by using the integral image, thus achieving an accurate and rapid locating and recognition of characters with background noise effectively suppressed and character information highlighted.

BRIEF DESCRIPTION OF THE DRAWINGS

FIG. 1.1 is a diagram of an effect of directly performing a binarization on a klunky banknote in conventional technology;

FIG. 1.2 is a diagram of an effect of performing a character locating on a banknote by using a binary image method in conventional technology;

FIG. 3.1 is a schematic diagram of a captured image G in the complex background-oriented optical character recognition method according to the second embodiment of the disclosure;

FIG. 3.2 is a schematic diagram of a target object $G_1$ in the complex background-oriented optical character recognition method according to the second embodiment of the disclosure;

FIG. 3.3 is a schematic diagram of Prewitt operator direction templates in the complex background-oriented optical character recognition method according to the second embodiment of the disclosure;

FIG. 3.4 is a schematic diagram of a contrast between sums of grayscales of pixels in the complex background-oriented optical character recognition method according to the second embodiment of the disclosure;

FIG. 3.5 is a schematic diagram of calculating a sum of grayscales of pixels by using an integral image method in the complex background-oriented optical character recognition method according to the second embodiment of the disclosure;

FIG. 3.6 is a schematic diagram of an original image of a 20 Yuan banknote in the complex background-oriented optical character recognition method according to the second embodiment of the disclosure;

FIG. 3.7 is a schematic diagram of a target object of the 20 Yuan banknote in the complex background-oriented optical character recognition method according to the second embodiment of the disclosure;

FIG. 3.8 is a schematic diagram of an extracted image of the 20 Yuan banknote in the complex background-oriented optical character recognition method according to the second embodiment of the disclosure;

FIG. 3.9 is a schematic diagram of a recovery image of the 20 Yuan banknote in the complex background-oriented optical character recognition method according to the second embodiment of the disclosure;

FIG. 3.10 is a schematic diagram of a processed image of the 20 Yuan banknote in the complex background-oriented optical character recognition method according to the second embodiment of the disclosure;

FIG. 3.11 is a schematic diagram of an integral image of the 20 Yuan banknote in the complex background-oriented optical character recognition method according to the second embodiment of the disclosure;

FIG. 3.12 is a schematic diagram of a location of the target characters of the 20 Yuan banknote in the complex background-oriented optical character recognition method according to the second embodiment of the disclosure;

DETAILED DESCRIPTION

In a complex background-oriented optical character recognition method and a device thereof provided according to embodiments of the disclosure, an original image and an image obtained by edge detection are superposed to obtain an image, then an inverse and a Gaussian filtering are performed on the image obtained. On the basis of the above, a calculation is performed on the image processed to obtain an integral image, and the locating process is accelerated by using the integral image, thus achieving an accurate and rapid locating and recognition of characters with background noise effectively suppressed and character information highlighted.

A Prewitt operator is a first order differential operator for edge detection, and an edge is detected on the basis that differences between grayscales of an upper adjacent pixel, a lower adjacent pixel, a left adjacent pixel and a right adjacent pixel of the pixel reach extreme values on an edge, which can eliminate some false edges and has a smoothing effect on noise. The edge detection is achieved by performing a neighborhood convolution on an image with two direction templates in an image space, where one of the two direction templates is used to detect a horizontal edge and the other is used to detect a vertical edge.

For a gray image, a value of any point (x, y) in an integral image is a sum of grayscales of all points in a rectangle region which has a diagonal from the top left corner of the gray image to the point (x, y).

It should be noted that the method and the device provided according to embodiments of the disclosure may be applied in locating and recognition of various image characters, such as recognition of a vehicle license number, a banknote crown word number and an identity number in an identity card, and detection of printed numbers in various product packaging. The method and the device provided according to embodiments of the disclosure are described hereinafter taking the recognition of a banknote crown word number for example, which should not interpreted as limiting the method and the device according to the present disclosure although only the recognition of a banknote crown word number is described.

Figure 2:
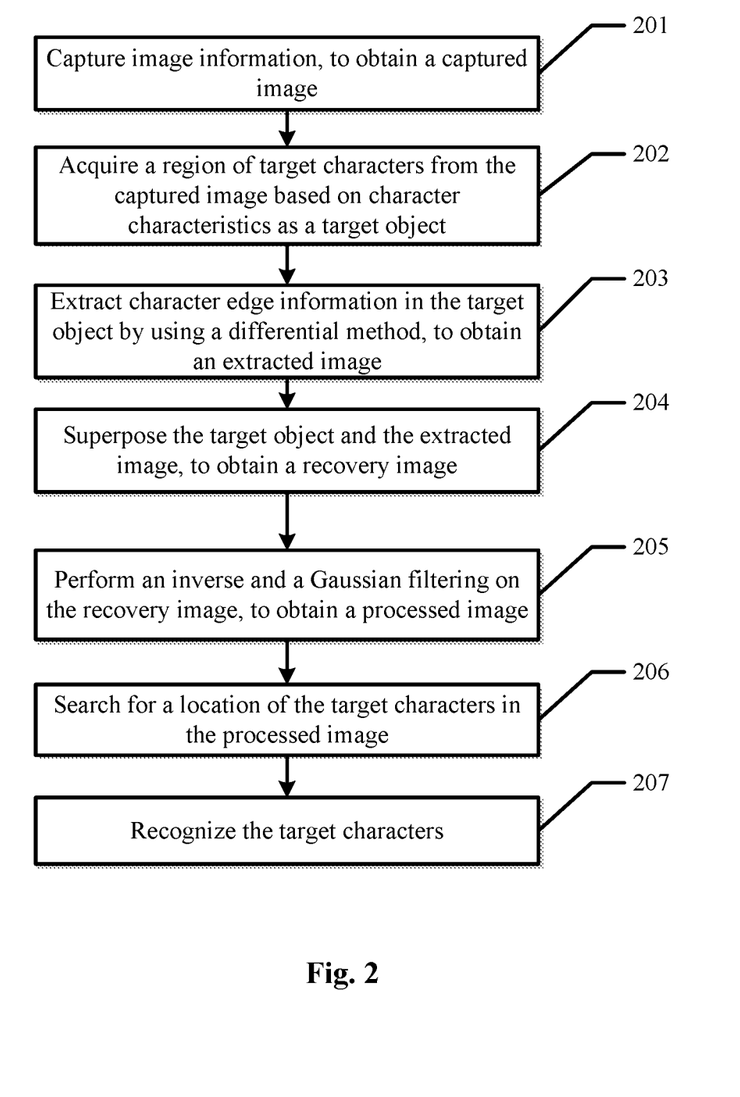
FIG. 2 is a flowchart of a complex background-oriented optical character recognition method according to a first embodiment of the disclosure.

As illustrated in FIG. 2, a complex background-oriented optical character recognition method provided according to a first embodiment of the disclosure includes steps 201 to 207.

In step 201, image information is captured to obtain a captured image.

Before locating and recognizing characters in an image, it is needed to capture image information of an object to be recognized such as an identity card and a vehicle license number, and the captured image is obtained after the capturing is completed.

In step 202, a region of target characters is acquired from the captured image based on character characteristics as a target object.

The region of target characters is only a part of the whole captured image. After the captured image is obtained, the region of target characters is acquired from the captured image based on character characteristics as the target object. Later locating and analyzing are mainly performed on the target object, which can greatly reduce a time of data processing.

In step 203, character edge information in the target object is extracted by using a differential method, to obtain an extracted image.

After the target object is acquired, the character edge information in the target object can be extracted by using the differential method, to obtain the extracted image.

In step 204, the target object and the extracted image is superposed to obtain a recovery image.

After the extracted image is obtained, the target object and the extracted image can be superposed, to obtain the recovery image.

In step 205, an inverse and a Gaussian filtering are performed on the recovery image, to obtain a processed image.

After the recovery image is obtained, the inverse and the Gaussian filtering can be performed on the recovery image, to obtain the processed image.

In step 206, a location of the target characters is searched for in the processed image.

After the processed image is obtained, the location of the target characters can be searched for in the processed image, to determine the location of the target characters for later recognition of the target characters.

In step 207, the target characters are recognized.

After the location of the target characters is determined, characters at the location of the target characters can be recognized, to obtain recognized characters.

In the embodiment of the disclosure, image information is captured first, to obtain a captured image; then a region of target characters is acquired from the captured image based on character characteristics as a target object; then character edge information in the target object is extracted by using a differential method, to obtain an extracted image; then the target object and the extracted image are superposed, to obtain a recovery image; then an inverse and a Gaussian filtering are performed on the recovery image, to obtain a processed image; then a location of the target characters is searched for in the processed image; and finally, the target characters are recognized. In the complex background-oriented optical character recognition method provided according to the present disclosure, an original image and an image obtained by edge detection are superposed to obtain an image, and then an inverse and a Gaussian filtering are performed on the image obtained. On the basis of the above, a calculation is performed on the image processed to obtain an integral image, and the locating process is accelerated by using the integral image, thus achieving an accurate and rapid locating and recognition of characters with background noise effectively suppressed and character information highlighted.

Figure 3:
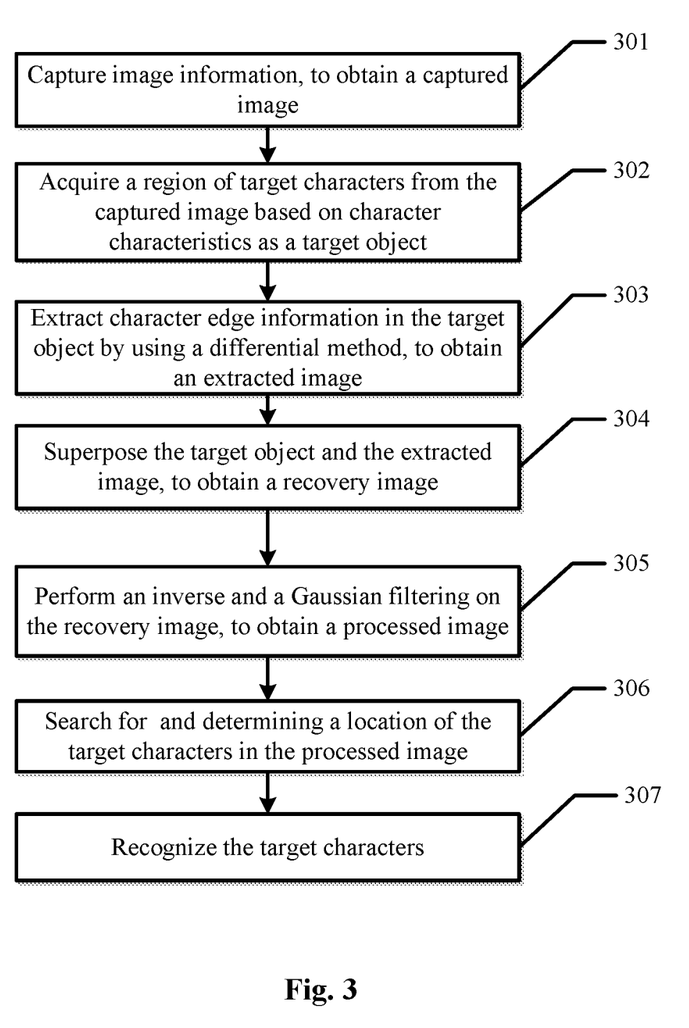
FIG. 3 is a flowchart of a complex background-oriented optical character recognition method according to a second embodiment of the disclosure.

The complex background-oriented optical character recognition method according to the first embodiment of the disclosure is described briefly above. A complex background-oriented optical character recognition method according to a second embodiment of the disclosure is described in detail hereinafter. As illustrated in FIG. 3, the complex background-oriented optical character recognition method according to the second embodiment of the disclosure includes steps 301 to 307.

In step 301, image information is captured to obtain a captured image.

Before locating and recognizing characters in an image, it is needed to collect image information of an object to be recognized such as an identity card and a vehicle license number, and the captured image G is obtained after the capturing is completed.

Figure 31:
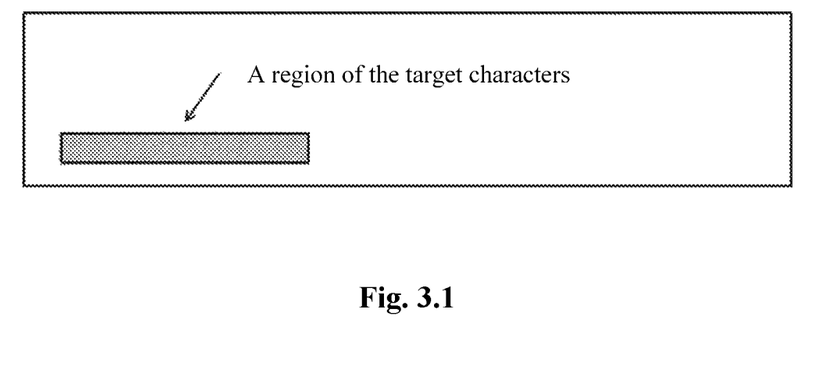

As illustrated in FIG. 3.1, the captured image G may be obtained by capturing image information with an image capture device or an image sensor, where the image sensor may be a full frame contact image sensor. Capturing an image with a full frame contact image sensor can capture the image information more fully, thus guaranteeing a validity of contents of the image.

In step 302, a region of target characters is acquired from the captured image based on character characteristics as a target object.

Figure 32:
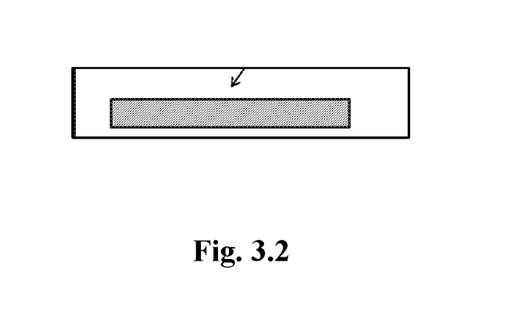

The region of target characters is only a part of the whole captured image. After the captured image G is obtained, the region of target characters is acquired from the captured image G based on character characteristics as a target object $G_1$. Later locating and analyzing are mainly performed on the target object $G_1$, which can greatly reduce time for data processing. The target object $G_1$ is illustrated in FIG. 3.2.

In step 303, character edge information in the target object is extracted by using a differential method, to obtain an extracted image.

After the target object is acquired, the character edge information in the target object can be extracted by using the differential method, to obtain the extracted image. The character edge information in the target object can be extracted by using a Prewitt operator for edge detection.

Figure 33:
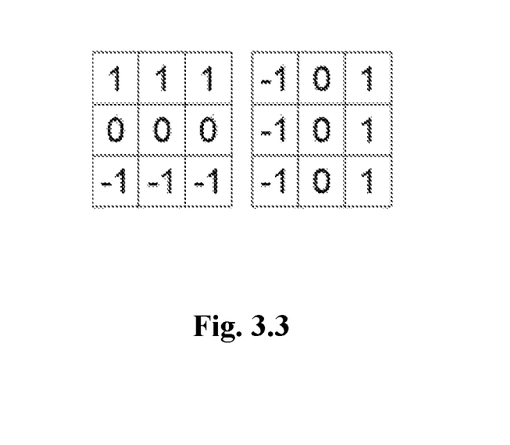

An advantage of using a differential operator is that an influence of noise can be suppressed while detecting an edge. A first order differential operator is used to detect an edge by using differences between grayscales of an adjacent up pixel, an adjacent down pixel, an adjacent left pixel and an adjacent right pixel of a pixel, which is achieved by performing a neighborhood convolution on an image with two direction templates in an image space. As illustrated in FIG. 3.3, one of the two direction templates is used to detect a horizontal edge and the other is used to detect a vertical edge.

For a digital image f(x, y), a differential operator is defined as follows:

$$P(i,j)=\max[G(i),G(j)], \text{ or } P(i,j)=G(i)+G(j),$$

where G(i) and G(j) are defined by the following formulas (2-1) to (2-6):

$$G(i)=|A_1-B_1| \quad (2\text{-}1)$$

$$A_1=f(i-1,j-1)+f(i-1,j)+f(i-1,j+1) \quad (2\text{-}2)$$

$$B_1=f(i+1,j-1)+f(i+1,j)+f(i+1,j+1) \quad (2\text{-}3)$$

$$G(j)=|A_2-B_2| \quad (2\text{-}4)$$

$$A_2=f(i-1,j+1)+f(i,j+1)+f(i+1,j+1) \quad (2\text{-}5)$$

$$B_2=f(i-1,j-1)+f(i,j-1)+f(i+1,j-1) \quad (2\text{-}6)$$

An extracted image $G_2$ is obtained by processing the target object $G_1$ with the differential operator, and edge information is highlighted in $G_2$.

In step 304, the target object and the extracted image is superposed, to obtain a recovery image.

After the extracted image $G_2$ is obtained, the target object $G_1$ and the extracted image $G_2$ can be superposed, to obtain a recovery image $G_3$.

In step 303, the character edge information is enhanced while a part of grayscale information is lost compared with the original image. The part of grayscale information can be recovered and an image effect can be significantly enhanced by performing a superposing computation on $G_1$ and $G_2$, where the superposing computation is defined based on the following formula:

$$G_3=\max(0,\min(255,G_1+G_2)).$$

In step 305, an inverse and a Gaussian filtering are performed on the recovery image, to obtain a processed image.

After the recovery image $G_3$ is obtained, the inverse and the Gaussian filtering can be performed on the recovery image, to obtain the processed image $G_4$.

A specific process of performing the inverse on the recovery image $G_3$ above may be expressed by the formula: G'=|255-G|, i.e., an inversed image is described by the formula |255-$G_3$|, and the processed image $G_4$ is obtained by performing a Gaussian filtering Φ(G') on the inversed image above. The inverse and the Gaussian filtering can not only highlight a visual effect of characters, but also reduce noise caused by error transfers, thereby smoothing the image.

In step 306, a location of the target characters is searched for and determined in the processed image.

After the processed image $G_4$ is obtained, the location of the target characters can be searched for in the processed image, to determine the location of the target characters for later recognition of the target characters.

The process of searching for the location of the target characters in the processed image may include: determining a search box based on the character characteristics and the processed image; and sliding the search box in the processed image continuously by a predetermined rule, calculating a sum of grayscales of pixels in the search box, and determining a location of the search box in which the sum of grayscales of pixels is the greatest to be the location of the target characters. The specific process is described as follows.

Figure 34:
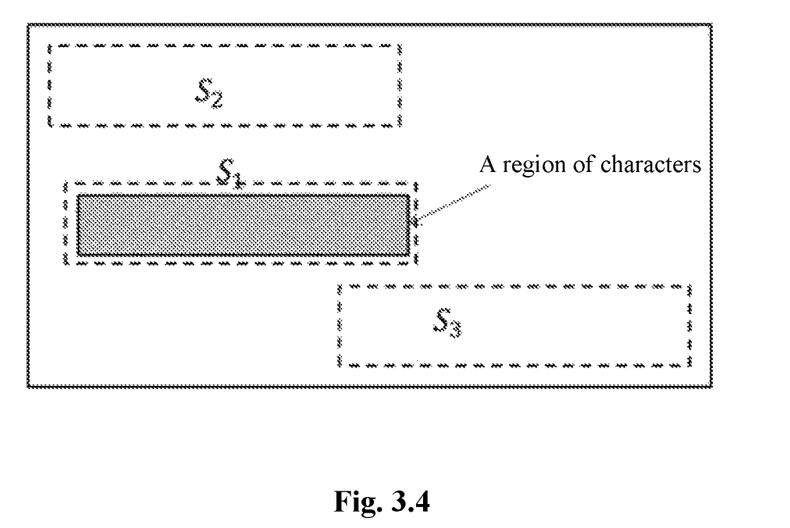

(1) since the location of the target characters is always the most brightest, i.e., a sum of grayscales of all pixels in the region at the location of the target characters is larger than a sum of grayscales of all pixels in any other surrounding region having a same size, as illustrated in FIGS. 3.4:

$$S_1>S_2, S_1>S_3, \ldots, \text{ and}$$

(2) a size and an area of an enclosing rectangle of the location of the target characters are relatively fixed, i.e., $S_1$=Q, where Q is a constant, thus a search box can be determined based on the character characteristics and the processed image, then the search box is slid in the processed image continuously by a predetermined rule, a sum of grayscales of pixels in the search box is calculated, and a location of the search box in which the sum of grayscales of pixels is the greatest is determined to be a location of the target characters. A time spent on the process above is determined by the following formula:

$$T \propto N \times S,$$

where N is the number of searches, and S is proportional to an area of the search box.

The process of searching for the location of the target characters in the processed image may include: determining a search box based on the character characteristics and the processed image; converting the processed image into an integral image; and sliding the search box in the integral image continuously by a predetermined rule, calculating a sum of grayscales of pixels in the search box, and determining a location of the search box in which the sum of grayscales of pixels is the greatest to be the location of the target characters. The specific process is described as follows.

For a gray image, a value of any point (x, y) in an integral image is a sum of grayscales of all pixel points in a rectangle region which has a diagonal from the top left corner of the gray image to the point (x, y), i.e., $$I(x, y) = \sum_{i=0}^{x} \sum_{j=0}^{y} G(i, j),$$

and after the integral image is obtained, a sum of grayscales of all pixels in any rectangle region in the image can be calculated rapidly, which is represented by U.

Figure 35:
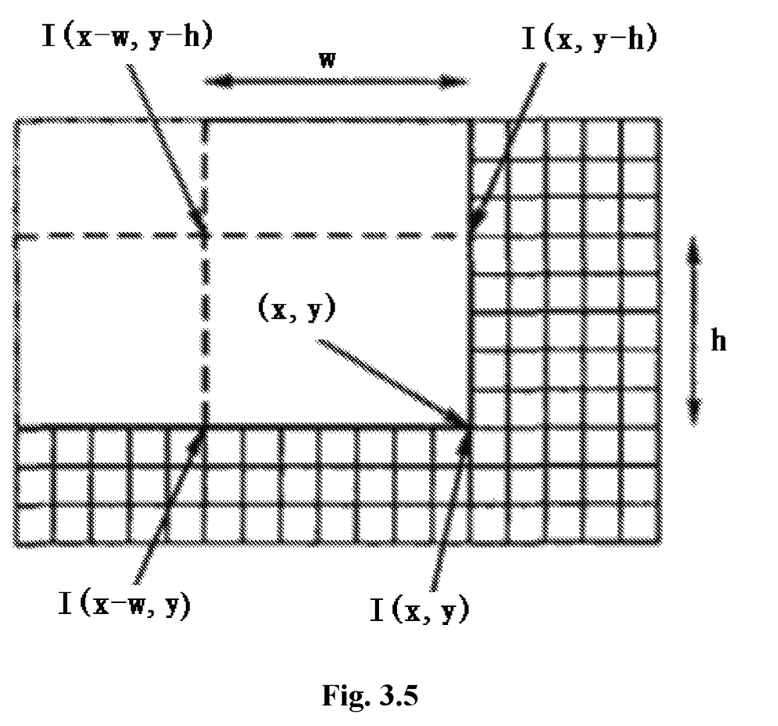
Figure 36:
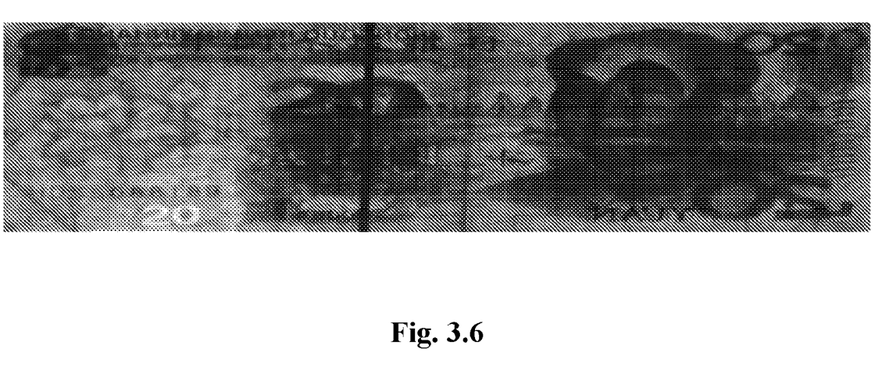
Figure 37:
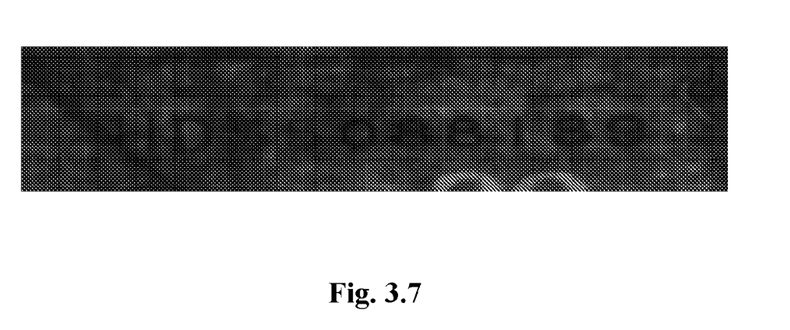
Figure 38:
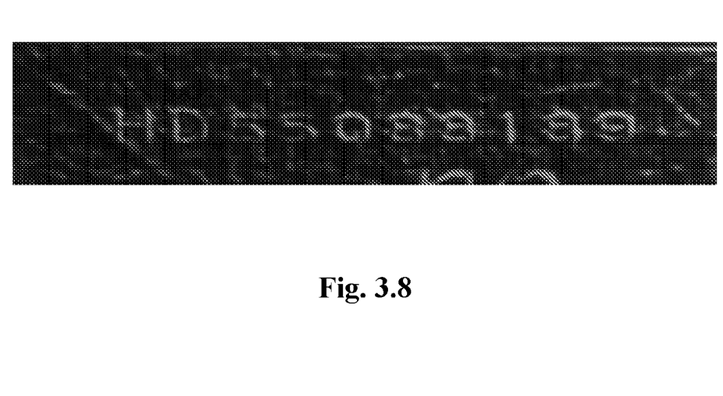
Figure 39:
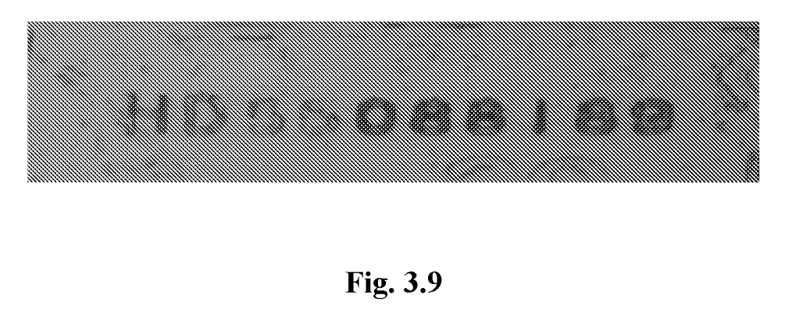
Figure 310:
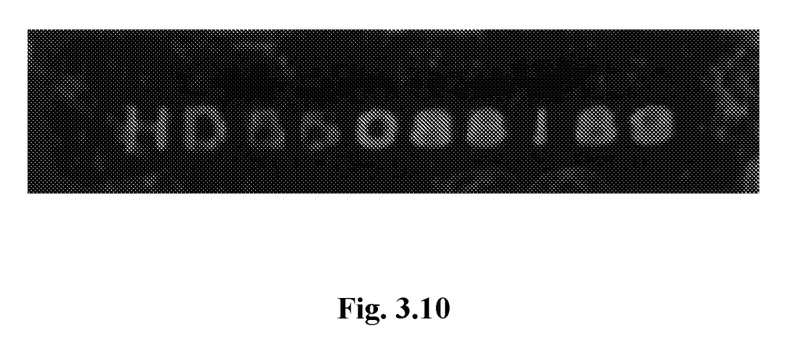
Figure 311:
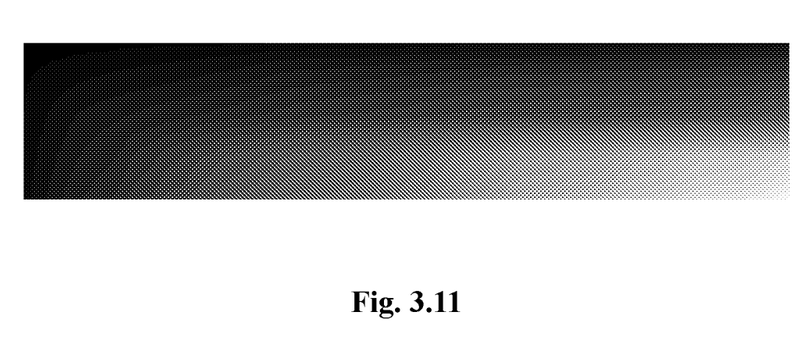
Figure 312:
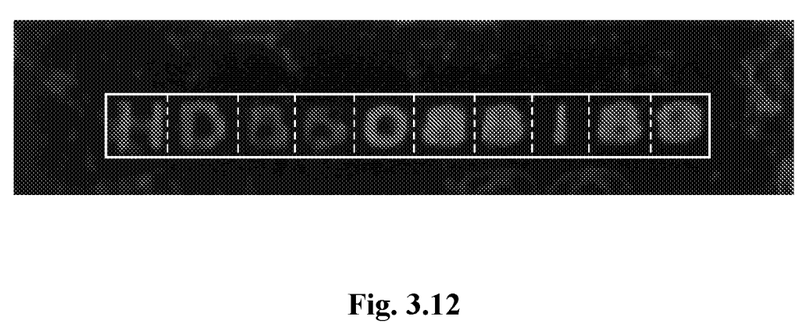

As illustrated in FIG. 3.5, (x, y) is a coordinate of the bottom right corner of a vertical rectangle, w, h are a width and a length of the vertical rectangle, respectively, and the sum of grayscales of all pixels in a region of the vertical rectangle is expressed by the following formula:

$$U=I(x,y)-I(x-w,y)-I(x,y-h)+I(x-w,y-h).$$

Searching for the location of the target characters by using the method above can greatly improve an efficiency of the searching, reduce a cost on resources and guarantee a real-time effect of a system.

In step 307, the target characters are recognized.

After the location of the target characters is determined, characters at the location of the target characters can be recognized, to obtain recognized characters.

The process of recognizing a crown word number of a 20 Yuan banknote is taken hereinafter for example to illustrate the method according to the embodiment of the disclosure.

First an original image of a 20 Yuan banknote is captured, where the capturing may be performed with a transmission light, and an image illustrated in FIG. 3.6 is obtained thereafter. Then a region of target characters is roughly located and cut out, where the region may have a width of 300 pixels and a height of 60 pixels, and a target object illustrated in FIG. 3.7 is obtained thereafter. Then character edge information in the target object is extracted by using a differential method, and an extracted image illustrated in FIG. 3.8 is obtained thereafter, wherein, it can be seen from FIG. 3.8 that the extracted image has much noise. Then the target object and the extracted image are superposed, and a recovery image illustrated in FIG. 3.9 is obtained thereafter, where an influence of a background on the image is well suppressed according to FIG. 3.9. Then an inverse and a Gaussian filtering are performed on the recovery image, and a processed image illustrated in FIG. 3.10 is obtained thereafter, where the processed image is comparatively smooth. At last, a location of the target characters is searched for in the processed image by a searching manner on an integral image, for example searching in the processed image with a search box having a width of 228 pixels and a height of 21 pixels, where a location of the search box in which the sum of grayscales of pixels is the greatest is determined to be the location of the target characters, and the target characters are recognized thereafter, where the integral image is illustrated in FIG. 3.11 and the location of the target characters is illustrated in FIG. 3.12.

In the embodiment of the disclosure, image information is captured first, to obtain a captured image; then a region of target characters is acquired from the captured image based on character characteristics as a target object; then character edge information in the target object is extracted by using a differential method, to obtain an extracted image; then the target object and the extracted image are superposed, to obtain a recovery image; then an inverse and a Gaussian filtering are performed on the recovery image, to obtain a processed image; then a location of the target characters is searched for in the processed image; and finally, the target characters are recognized. In the complex background-oriented optical character recognition method provided according to the present disclosure, an original image and an image obtained by edge detection are superposed to obtain an image, and then an inverse and a Gaussian filtering are performed on the image obtained. On the basis of the above, a calculation is performed on the image processed to obtain an integral image, and the locating process is accelerated by using the integral image, thus achieving an accurate and rapid locating and recognition of characters with background noise effectively suppressed and character information highlighted.

Figure 4:
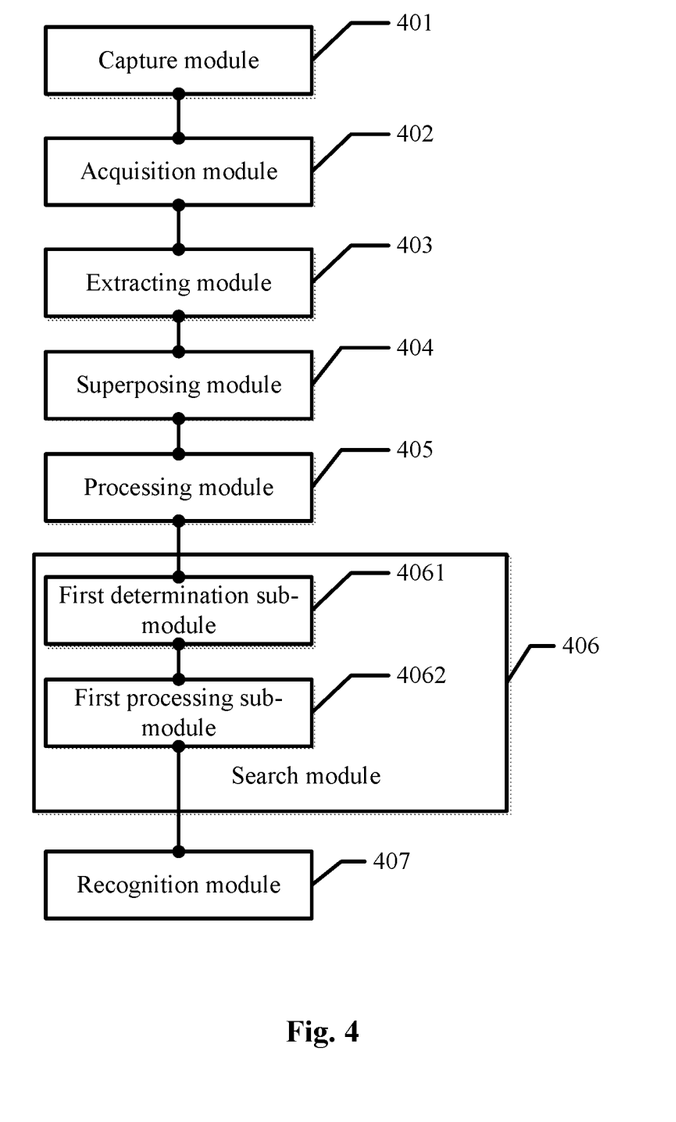
FIG. 4 is a first structural schematic diagram of a complex background-oriented optical character recognition device according to an embodiment of the disclosure.
Figure 5:
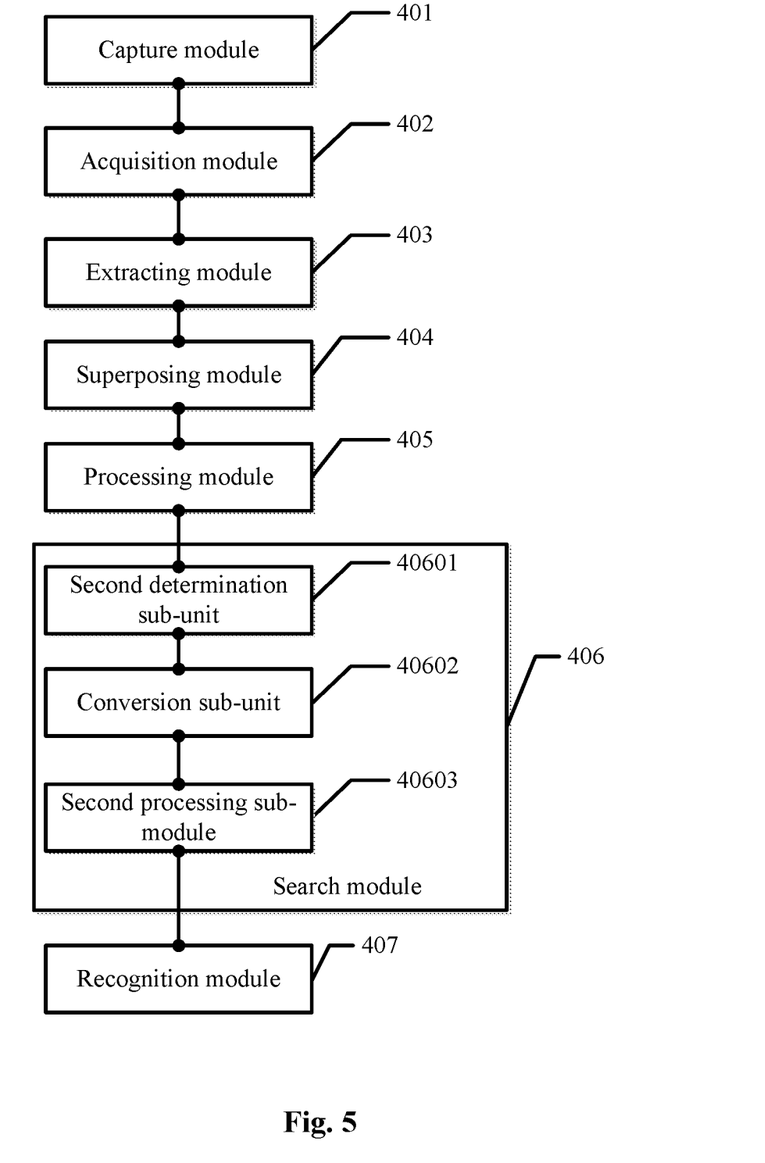
FIG. 5 is a second structural schematic diagram of a complex background-oriented optical character recognition device according to an embodiment of the disclosure.

The complex background-oriented optical character recognition method according to the second embodiment of the disclosure, especially the processes of extracting character edge information in the target object by using a differential method and searching for a location of the target characters in the processed image, is described in detail above. A complex background-oriented optical character recognition device according to an embodiment of the disclosure is described hereinafter. As illustrated in FIGS. 4 and 5, the complex background-oriented optical character recognition device according to the embodiment of the disclosure includes:

a capture module 401, configured to capture image information, to obtain a captured image;

an acquisition module 402, configured to acquire a region of target characters from the captured image based on character characteristics as a target object;

an extracting module 403, configured to extract character edge information in the target object by using a differential method, to obtain an extracted image;

a superposing module 404, configured to superpose the target object and the extracted image, to obtain a recovery image;

a processing module 405, configured to perform an inverse and a Gaussian filtering on the recovery image, to obtain a processed image;

a search module 406, configured to search for a location of the target characters in the processed image; and a recognition module 407, configured to recognize the target characters.

As illustrated in FIG. 4, the search module 406 according to the embodiment of the disclosure may include:

a first determination sub-module 4061, configured to determine a search box based on the character characteristics and the processed image; and a first processing sub-module 4062, configured to slide the search box in the processed image continuously by a predetermined rule, calculate a sum of grayscales of pixels in the search box, and determine a location of the search box in which the sum of grayscales of pixels is the greatest to be a location of the target characters.

Optionally, as illustrated in FIG. 5, the search module 406 according to the embodiment of the disclosure may include:

a second determination sub-unit 40601, configured to determine a search box based on the character characteristics and the processed image;

a conversion sub-unit 40602, configured to convert the processed image into an integral image; and a second processing sub-module 40603, configured to slide the search box in the integral image continuously by a predetermined rule, calculate a sum of grayscales of pixels in the search box, and determine a location of the search box in which the sum of grayscales of pixels is the greatest to be a location of the target characters.

In the embodiment of the disclosure, before locating and recognizing characters in an image, the capture module 401 needs to capture image information of an object to be recognized such as an identity card and a vehicle license number, to obtain a captured image. A region of target characters is only a part of the whole captured image, and after the captured image is obtained, the acquisition module 402 acquires the region of target characters from the captured image based on character characteristics as a target object. Later locating and analyzing are mainly performed on the target object, which can greatly reduce a time of data processing.

After the target object is acquired, the extracting module 403 extracts character edge information in the target object by using a differential method, to obtain an extracted image. After the extracted image is obtained, the superposing module 404 superposes the target object and the extracted image, to obtain a recovery image. After the recovery image is obtained, the processing module 405 performs an inverse and a Gaussian filtering on the recovery image, to obtain a processed image. After the processed image is obtained, the search module 406 searches for a location of the target characters in the processed image, to determine the location of the target characters for later recognition of the target characters. At last, the recognition module 407 recognizes the target characters at the location of the target characters, to obtain recognized characters.

The search module 406 searches for a location of the target characters in the processed image may include:

the first determination sub-module 4061 determines a search box based on the character characteristics and the processed image; and the first processing sub-module 4062 slides the search box in the processed image continuously by a predetermined rule, calculates a sum of grayscales of pixels in the search box, and determines a location of the search box in which the sum of grayscales of pixels is the greatest to be a location of the target characters.

The search module 406 searches for a location of the target characters in the processed image as follows: the second determination sub-unit 40601 determines a search box based on the character characteristics and the processed image; the conversion sub-unit 40602 converts the processed image into an integral image; and at last, the second processing sub-module 40603 slides the search box in the integral image continuously by a predetermined rule, calculates a sum of grayscales of pixels in the search box, and determines a location of the search box in which the sum of grayscales of pixels is the greatest to be a location of the target characters.

In the embodiment of the disclosure, the complex background-oriented optical character recognition device includes: a capture module 401, configured to capture image information, to obtain a captured image; an acquisition module 402, configured to acquire a region of target characters from the captured image based on character characteristics as a target object; an extracting module 403, configured to extract character edge information in the target object by using a differential method, to obtain an extracted image; a superposing module 404, configured to superpose the target object and the extracted image, to obtain a recovery image; a processing module 405, configured to perform an inverse and a Gaussian filtering on the recovery image, to obtain a processed image; a search module 406, configured to search for a location of the target characters in the processed image; and a recognition module 407, configured to recognize the target characters. The complex background-oriented optical character recognition device provided according to the present disclosure superposes an original image and an image obtained by edge detection to obtain an image, then performs an inverse and a Gaussian filtering on the image obtained, on the basis of the above, performs a calculation on the processed image to obtain an integral image, and accelerate the locating process by using the integral image, thus achieving an accurate and rapid locating and recognition of characters with background noise effectively suppressed and character information highlighted.

Those in the art shall understand a part of or all of the steps in the method embodiments may be performed by program instructing related hardware. The program may be stored in a computer readable storage medium, where the storage above may be a read-only memory or a disk.

A complex background-oriented optical character recognition method and a device thereof according to the present disclosure are described above. Alternations on particular implementations and application ranges may be made by those skilled in the art according to the essence of embodiments of the disclosure. As apparent from the foregoing, the specification should not be interpreted as limiting the disclosure.

The invention claimed is:

1. A complex background-oriented optical character recognition method, comprising:
   capturing image information, to obtain a captured image;
   acquiring a region of target characters from the captured image based on character characteristics as a target object;
   extracting character edge information in the target object by using a differential method, to obtain an extracted image;
   superposing the target object and the extracted image, to obtain a recovery image;
   performing an inverse and a Gaussian filtering on the recovery image, to obtain a processed image;
   searching for a location of the target characters in the processed image; and
   recognizing the target characters.

2. The complex background-oriented optical character recognition method according to claim 1, wherein, the capturing the image information comprises:
   capturing image information with an image sensor.

3. The complex background-oriented optical character recognition method according to claim 2, wherein the image sensor comprises:
   a full frame contact image sensor.

4. The complex background-oriented optical character recognition method according to claim 1, wherein, the extracting the character edge information in the target object by using the differential method comprises:
   extracting the character edge information in the target object by using a Prewitt operator edge detection method.

5. The complex background-oriented optical character recognition method according to claim 1, wherein, the searching for the location of the target characters in the processed image comprises:
   determining a search box based on the character characteristics and the processed image; and
   sliding the search box in the processed image continuously by a predetermined rule, calculating a sum of grayscales of pixels in the search box, and determining a location of the search box in which the sum of grayscales of pixels is the greatest to be the location of the target characters.

6. The complex background-oriented optical character recognition method according to claim 1, wherein, the searching for the location of the target characters in the processed image comprises:

determining a search box based on the character characteristics and the processed image;

converting the processed image into an integral image; and sliding the search box in the integral image continuously by a predetermined rule, calculating a sum of grayscales of pixels in the search box, and determining a location of the search box in which the sum of grayscales of pixels is the greatest to be the location of the target characters, wherein a value of a point in the integral image is a sum of grayscales of all pixels in a rectangle region which has a diagonal from the top left corner of the processed image to the point.

7. A complex background-oriented optical character recognition device, comprising a capture device and a processor, wherein, the capture device is configured to capture image information, to obtain a captured image; and the processor is configured to:

acquire a region of target characters from the captured image based on character characteristics as a target object;

extract character edge information in the target object by using a differential method, to obtain an extracted image;

superpose the target object and the extracted image, to obtain a recovery image;

perform an inverse and a Gaussian filtering on the recovery image, to obtain a processed image;

search for a location of the target characters in the processed image; and recognize the location of the target characters.

8. The complex background-oriented optical character recognition device according to claim 7, wherein, the processor is further configured to:

determine a search box based on the character characteristics and the processed image; and slide the search box in the processed image continuously by a predetermined rule, calculate a sum of grayscales of pixels in the search box, and determine a location of the search box in which the sum of grayscales of pixels is the greatest to be the location of the target characters.

9. The complex background-oriented optical character recognition device according to claim 7, wherein, the processor is further configured to:

determine a search box based on the character characteristics and the processed image;

convert the processed image into an integral image; and slide the search box in the integral image continuously by a predetermined rule, calculate a sum of grayscales of pixels in the search box, and determine a location of the search box in which the sum of grayscales of pixels is the greatest to be the location of the target characters.

* * * * *